United States Patent
Levy et al.

(10) Patent No.: US 10,169,000 B2
(45) Date of Patent: Jan. 1, 2019

(54) PROVISIONING COMPOSITE APPLICATIONS USING SECURE PARAMETER ACCESS

(75) Inventors: Ohad Shaul Anaf Levy, Raanana (IL); Amos Benari, Yokneam Hamoshave (IL)

(73) Assignee: Red Hat Israel, Ltd., Raanana (IL)

( * ) Notice: Subject to any disclaimer, the term of this patent is extended or adjusted under 35 U.S.C. 154(b) by 1137 days.

(21) Appl. No.: 13/484,194

(22) Filed: May 30, 2012

(65) Prior Publication Data

US 2013/0326498 A1 Dec. 5, 2013

(51) Int. Cl.
*G06F 9/445* (2018.01)
*G06F 8/30* (2018.01)
(Continued)

(52) U.S. Cl.
CPC ............. *G06F 8/31* (2013.01); *G06F 8/60* (2013.01); *G06F 9/45558* (2013.01);
(Continued)

(58) Field of Classification Search
CPC ..... G06F 8/61; G06F 8/60; G06F 8/65; G06F 8/63; G06F 15/17; G06F 15/17337; G06F 15/17381; G06F 12/0813; G06F 9/5016; G06F 9/3867; G06F 13/4022; G06F 9/3885; G06F 9/3851; G06F 9/3824; G06F 9/3836; G06F 9/3891; G06F 9/3879; G06F 9/3877; G06F 9/3001; G06F 9/30087;
(Continued)

(56) References Cited

U.S. PATENT DOCUMENTS 6,950,825 B2 * 9/2005 Chang ................ G06F 21/6218
7,203,937 B1 * 4/2007 Kyle ......................... G06F 8/60
709/222
(Continued)

FOREIGN PATENT DOCUMENTS

WO WO2012/079886 * 11/2011 ......... G06F 9/45558

OTHER PUBLICATIONS

Konstantinou, Alexander V., et al. "An architecture for virtual solution composition and deployment in infrastructure clouds." 2009. Proceedings of the 3rd international workshop on Virtualization technologies in distributed computing. ACM.*
(Continued)

*Primary Examiner* — Lewis A Bullock, Jr.
*Assistant Examiner* — Gilles R Kepnang
(74) *Attorney, Agent, or Firm* — Lowenstein Sandler LLP

(57) ABSTRACT

A mechanism for provisioning composite application using secure parameter access is disclosed. A method of one embodiment of the disclosure includes receiving a request for a configuration parameter from a first component of a composite Web application residing on a first virtual machine (VM). The requested configuration parameter can be related to a second component of the composite Web application residing on a second VM. The role of the first component of the composite Web application is identified and a determination is made as to whether the first component has access to the requested configuration parameter based on the role of the first component. If the first component has access, then the requested configuration parameter is provided to the first component.

19 Claims, 11 Drawing Sheets

(51) Int. Cl.
  *G06F 9/455* (2018.01)
  *G06F 8/60* (2018.01)
(52) U.S. Cl.
  CPC ...... *G06F 9/44505* (2013.01); *G06F 9/45516* (2013.01); *G06F 9/45537* (2013.01); *G06F 2009/45587* (2013.01)
(58) Field of Classification Search
  CPC .... G06F 9/5077; G06F 9/45537; G06F 9/445; G06F 9/455; G06F 9/4843; G06F 9/52; G06F 9/4881; G06F 9/485; G06F 9/5027; G06F 9/4887; G06F 8/45; G06F 21/6218; G06F 21/6227; G06F 17/30067; G06F 17/30286; G06F 9/5083; G06F 3/067; G06F 17/30011; G06F 2221/2141; G06F 21/604; G06F 17/30867; G06F 17/3089; G06F 17/30595; G06F 9/4433; G06F 17/30115; G06F 9/45533–9/45558; G06F 2009/45562–2009/45595; G06F 9/44505; G06F 17/30893; G06F 2009/45587; H04L 29/08981; H04L 29/08936; H04L 63/0807; G06Q 10/10; G06Q 30/02
  See application file for complete search history.

(56) References Cited

U.S. PATENT DOCUMENTS

| | | | |
|---|---|---|---|
| 7,779,389 B2* | 8/2010 | Markov | G06F 9/44505 717/120 |
| 8,015,343 B2* | 9/2011 | Garman et al. | 711/100 |
| 8,214,372 B2* | 7/2012 | Gupta | G06F 9/44505 707/748 |
| 8,321,558 B1* | 11/2012 | Sirota et al. | 709/224 |
| 8,572,593 B2* | 10/2013 | Vedula | G06F 11/302 717/121 |
| 8,584,121 B2* | 11/2013 | Arcese | G06F 8/60 707/E17.001 |
| 8,826,268 B2* | 9/2014 | Jacobson | G06F 8/60 717/174 |
| 2002/0031230 A1* | 3/2002 | Sweet | H04L 63/0428 380/278 |
| 2004/0078354 A1* | 4/2004 | Pass | 707/1 |
| 2004/0193909 A1* | 9/2004 | Chang | H04L 63/102 726/14 |
| 2005/0160428 A1* | 7/2005 | Ayachitula | G06F 9/50 718/104 |
| 2006/0037000 A1* | 2/2006 | Speeter | H04L 67/10 717/120 |
| 2007/0118844 A1* | 5/2007 | Huang et al. | 719/330 |
| 2007/0165937 A1* | 7/2007 | Markov | G06F 9/44505 382/141 |
| 2007/0180493 A1* | 8/2007 | Croft et al. | 726/2 |
| 2007/0198975 A1* | 8/2007 | Alnas | G06F 8/60 717/168 |
| 2007/0255841 A1* | 11/2007 | Chong | H04L 63/0807 709/229 |
| 2008/0163194 A1* | 7/2008 | Dias | G06F 8/60 717/174 |
| 2009/0064272 A1* | 3/2009 | Goldszmidt | H04L 63/105 726/1 |
| 2009/0094629 A1* | 4/2009 | Lee et al. | 725/10 |
| 2009/0193439 A1* | 7/2009 | Bernebeu-Auban | G06F 8/61 719/320 |
| 2009/0254572 A1* | 10/2009 | Redlich et al. | 707/10 |
| 2009/0282404 A1* | 11/2009 | Khandekar | G06F 9/45558 718/1 |
| 2009/0300341 A1* | 12/2009 | Buehler | G06F 9/44505 713/1 |
| 2010/0042988 A1* | 2/2010 | Lundin | G06F 9/44505 717/176 |
| 2010/0095297 A1* | 4/2010 | Sethi | G06F 8/63 718/1 |
| 2010/0199276 A1* | 8/2010 | Umbehocker | 718/1 |
| 2010/0242038 A1* | 9/2010 | Berrange | G06F 21/445 718/1 |
| 2010/0281528 A1* | 11/2010 | Hayton et al. | 726/7 |
| 2010/0293168 A1* | 11/2010 | Gupta | G06F 9/44505 707/748 |
| 2010/0306772 A1* | 12/2010 | Arnold | G06F 8/36 718/1 |
| 2011/0004916 A1* | 1/2011 | Schiffman | G06F 9/5011 726/1 |
| 2011/0047535 A1* | 2/2011 | Polakam | G06F 9/542 717/168 |
| 2011/0246830 A1* | 10/2011 | Chowdhury | G06F 8/40 714/35 |
| 2011/0265168 A1* | 10/2011 | Lucovsky et al. | 726/7 |
| 2012/0030672 A1* | 2/2012 | Zygmuntowicz et al. | 718/1 |
| 2012/0054741 A1* | 3/2012 | Ali | H04L 9/3231 718/1 |
| 2012/0079565 A1* | 3/2012 | Krahulec | G06F 17/30893 726/3 |
| 2012/0151198 A1* | 6/2012 | Gupta | G06F 9/45558 713/2 |
| 2012/0151444 A1* | 6/2012 | Weissman | G06F 8/70 717/122 |
| 2012/0158920 A1* | 6/2012 | Yang | G06F 8/61 709/220 |
| 2012/0159567 A1* | 6/2012 | Toy | G06Q 10/00 726/1 |
| 2012/0185529 A1* | 7/2012 | Shimamoto | G06F 9/5072 709/203 |
| 2012/0240103 A1* | 9/2012 | Padmanabhuni | G06F 9/44505 717/121 |
| 2013/0152078 A1* | 6/2013 | Arcilla | G06F 9/45558 718/1 |
| 2013/0152080 A1* | 6/2013 | Sachindran | G06F 9/44526 718/1 |
| 2013/0219388 A1* | 8/2013 | Moeller | G06F 9/45558 718/1 |
| 2013/0232480 A1* | 9/2013 | Winterfeldt | G06F 8/60 717/177 |
| 2013/0246995 A1* | 9/2013 | Ferrao | G06F 8/35 717/104 |
| 2013/0254758 A1* | 9/2013 | Walter | G06F 8/61 717/174 |
| 2013/0275958 A1* | 10/2013 | Ivanov | G06F 8/61 717/174 |
| 2013/0332900 A1* | 12/2013 | Berg | G06F 8/71 717/121 |

OTHER PUBLICATIONS

Etchevers, Xavier, et al. "Automated configuration of legacy applications in the cloud." 2011. Utility and Cloud Computing (UCC), 2011 Fourth IEEE International Conference on. IEEE.*

* cited by examiner

VM Table
305

| CID | VM | Application | AppType | Role | Configuration Data |
|-----|----|-----|-----|-----|-----|
| CID | VM | Application | AppType | Role | Configuration Data |
| CID | VM | Application | AppType | Role | Configuration Data |
| CID | VM | Application | AppType | Role | Configuration Data |
| CID | VM | Application | AppType | Role | Configuration Data |
| CID | VM | Application | AppType | Role | Configuration Data |

| 123 | Host.com | ABC | Blog | App Server | Configuration Data |
|-----|----------|-----|------|------------|---------------------|

Application Table 310

| AID | Name | Type | CID1 | CID2 | CID3+ |
|-----|------|------|------|------|-------|
| AID | Name | Type | CID1 | CID2 | CID3+ |
| AID | Name | Type | CID1 | CID2 | CID3+ |
| AID | Name | Type | CID1 | CID2 | CID3+ |
| AID | Name | Type | CID1 | CID2 | CID3+ |
| AID | Name | Type | CID1 | CID2 | CID3+ |

*Fig. 3*

PROVISIONING COMPOSITE APPLICATIONS USING SECURE PARAMETER ACCESS

TECHNICAL FIELD

The embodiments of the invention relate generally to software provisioning and, more specifically, relate to a mechanism for provisioning a composite application.

BACKGROUND

Software provisioning is the process of loading the appropriate software (such as operating system, device drivers, middleware, and applications) on a target machine, and customizing and configuring the system and the software to make it ready for operation. Software provisioning can entail a variety of tasks, such as creating or changing a boot image, and specifying parameters such as IP address, IP gateway, and network connections. The machine being provisioned can be a physical machine or a virtual machine executing on a host.

A composite application is an application that is installed on multiple machines. Usually the composite application is installed on multiple virtual machines, where each component of the application is installed on a virtual machine optimized for the component. The composite application and its components are made up of several software "applications," so the composite application will sometimes be referred to as a composite service.

For example, a composite application or service can be a Web application, such as a social networking site, or a blog site. Such a composite application can have various components. For example, a 3-tier application will have an interface tier (Web server), a business logic tier (application server) and a data tier (database management system). Various other tiers are possible, including an orchestration tier to distribute and manage jobs between multiple servers and a load balancing tier to distribute load between clients and the interface tier. The numbers of each of the components of a composite application can increase and decrease dynamically based on demand, making it difficult to manually provision and configure components of a distributed composite application.

BRIEF DESCRIPTION OF THE DRAWINGS

Embodiments of the invention will be understood more fully from the detailed description given below and from the accompanying drawings of various embodiments of the invention. The drawings, however, should not be taken to limit the invention to the specific embodiments, but are for explanation and understanding only.

FIG. 3 is a block diagram illustrating data structures used by a provisioning server according to one embodiment of the present invention.

DETAILED DESCRIPTION

Figure 1:
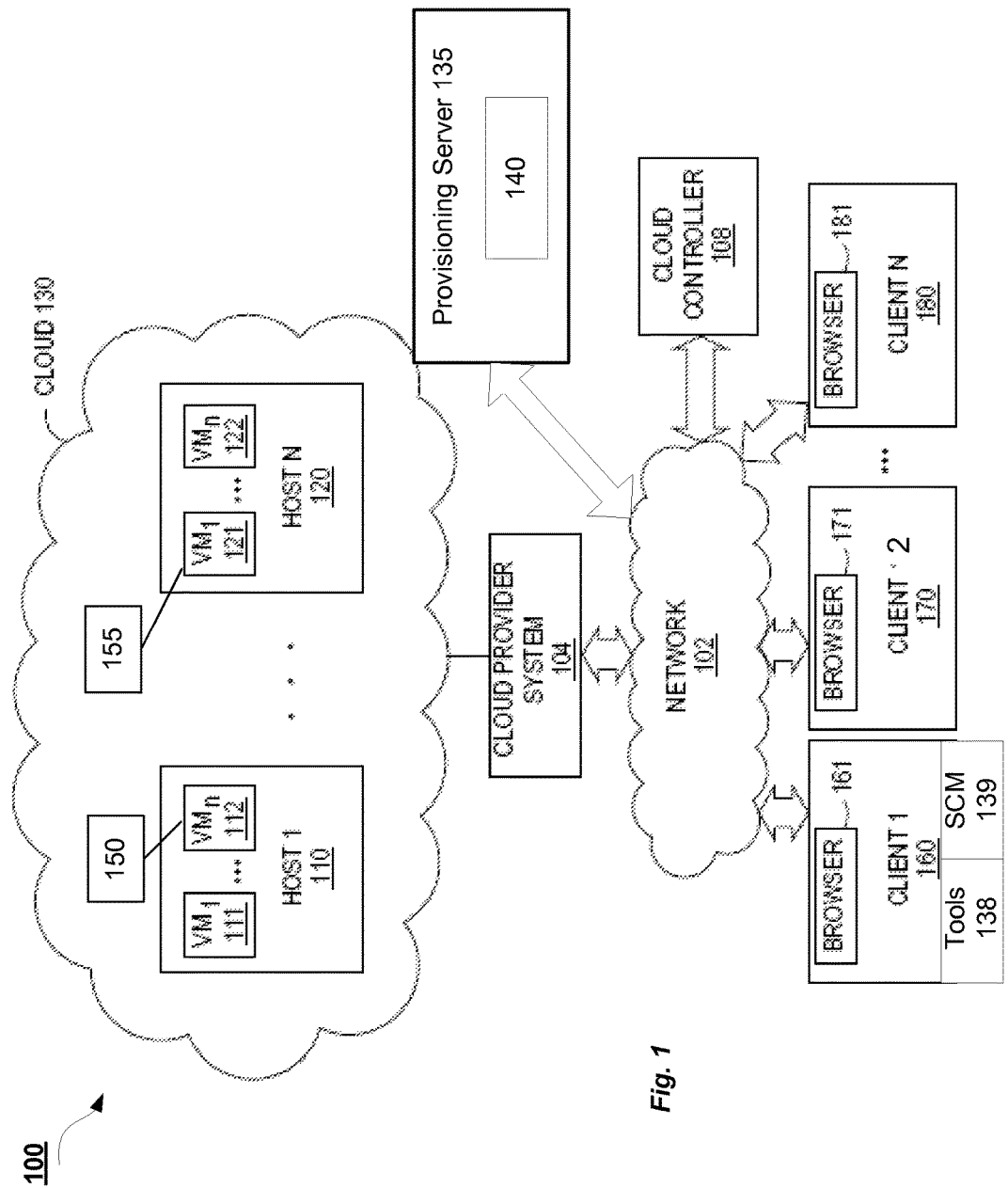
FIG. 1 is a block diagram of a network environment for implementing a provisioning server according to one embodiment of the present invention.

Embodiments of the invention provide a mechanism for provisioning composite application using secure parameter access. A method of embodiments of the invention includes receiving a request for a configuration parameter from a first component of a composite Web application residing on a first virtual machine (VM). The requested configuration parameter can be related to a second component of the composite Web application residing on a second VM. The role of the first component in the composite Web application is identified and a determination is made as to whether the first component has access to the requested configuration parameter based on the role of the first component. If the first component has access, then the requested configuration parameter is provided to the first component.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "comparing," "matching," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

FIG. 1 is a block diagram of a network architecture 100 in which embodiments of the invention may operate. The network architecture 100 includes a cloud 130 managed by a cloud provider system 104. The cloud 130 provides virtual machines, such as virtual machines 111, 112, 121, and 122. Each virtual machine is hosted on a physical machine configured as part of the cloud 130. Such physical machines are often located in a data center. For example, virtual machines 111 and 112 are hosted on physical machine 110 in cloud 130 provided by cloud provider 104. Users can interact with applications executing on cloud-based virtual machines using client computer systems, such as clients 160, 170 and 180, via corresponding web browser programs 161, 171 and 181. Clients 160, 170 and 180 may be associated with one or more organizations other than that maintaining the cloud 130.

Clients 160, 170 and 180 are connected to hosts 110, 120 and the cloud provider system 104 via a network 102, which may be may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the network architecture includes a provisioning server 135 to configure components of composite applications. A composite application is a single service (such as a blog) that is implemented by several separate components being provided by multiple virtual machines. For example, component 150 residing on VM 112 and component 155 residing on VM 121 can be separate components of a single composite application. In one embodiment, the provisioning server 135 stores configuration parameters to configure the components of the composite application in one or more hierarchical data stores 140. The provisioning server 135 may be hosted by the same machine(s) as the cloud provider system 104 or one or more other machines such as server computers, desktop computers, etc.

While various embodiments are described in terms of the environment described above, the facility may be implemented in a variety of other environments including a single, monolithic computer system, as well as various other combinations of computer systems or similar devices connected in various ways.

Figure 2:
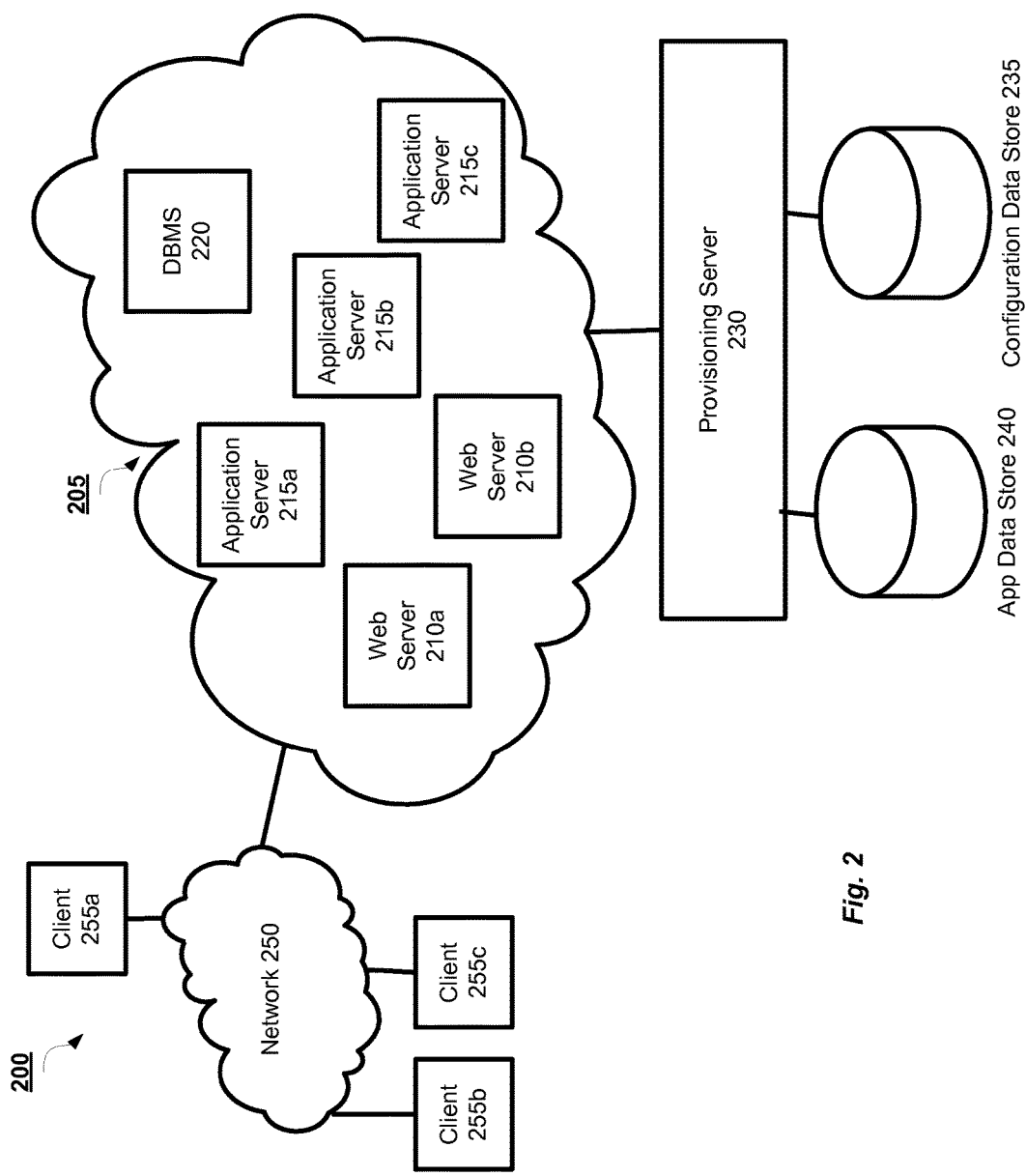
FIG. 2 is a block diagram of a composite application provisioned using a provisioning server according to one embodiment of the present invention.

FIG. 2 is a block diagram illustrating a computing environment 200 according to an embodiment of the invention. The computing environment includes a cloud 205 implemented by a cloud provider that can instantiate virtual machines that can be used to execute application and components of composite applications. As an example, the virtual machines used to implement one such composite application are shown in FIG. 2. The composite application may be a multi-tier application (e.g., three tier application) and the components may include Web servers, application servers, and database management systems. In the example shown in FIG. 2, the composite application has two Web server components 210a,b, three application server components 215a-c, and one database management system 220. In one embodiment, each of these components is implemented on a separate virtual machine, although they may or may not be hosted on the same physical host machine.

The composite application can be accessed by users, for example, via client machines 255a-c that can access the cloud 205 via a network 250, such as the Internet. In a usual Web application, the client 255 would interact with a Web server 210 using a protocol such as HTTP/S, and the Web server 210 would service the requests of the client 255 by interacting with an application server 215, which may in turn interact with a database management system 220.

The components of the composite application may change to demand, by request from the application owner, changes in the network, or for several other reasons. For example, if the third application server 215c is added due to increased load on the first two application servers 215a,b, then the third application server 215c needs to be configured to operate as part of the composite application. In one embodiment, the application server 215c would be brought online by the cloud provider as a pre-configured application server. However, after being booted up, the new application server 215c will still need to be configured to operate as part of the composite application.

A new component being added to the composite application—or a component requesting a periodic reconfiguration or update—may need several configuration parameters to operate as part of the composite application. For example, an application server may need to know its assigned databases, the database passwords, connection pooling and other resource pooling settings, failover settings, security settings, among other configuration settings and parameters.

In one embodiment, a component being configured can request its configuration parameters from a provisioning server 230. The provisioning server 230 maintains a configuration data store 235 that contains the values and rules for determining and calculating the appropriate values for configuration parameters. In one embodiment, the provisioning server 230 accesses an application data store 240 and a configuration data store 235 to provide requested configuration information. The application data store 240 and a configuration data store 235 can reside on one physical storage device, separate storage devices, network storage, or any other storage mechanism.

FIG. 3 illustrates two example data structures that can be stored in one embodiment in the application data store 240. Embodiments of such data structures are used by the provisioning server 230 to maintain information about the composite Web applications being provisioned by the provisioning server 230. In one embodiment, the application data store can include a virtual machine (VM) table.

One embodiment of a VM table is illustrated with reference to FIG. 3. The VM table 305 includes entries or records that each represent one of the VMs provisioned by the provisioning server 230. In one embodiment, a record includes a component identifier (CID) or the component of a distributed Web application being provided by the VM, a VM identifier—such as the hostname of the VM—an Application identifier—such as the name of the distributed application—such as "Bob's Food Blog"—an application type identifier—such as "Blog"—a role of the component—such as "database"—and various configuration data that indicated the present configuration of the VM referenced by the record.

In one embodiment, the application data store 240 also includes an application table 310. The application table contains records corresponding with composite Web applications that are provisioned by the provisioning server 230. In one embodiment, each record includes an application identifier, an application name, an application type, and a list of all the individual components that make up the composite Web application With reference again to FIG. 2, configuration values and rules are stored, in one embodiment, in configuration data store 235 that is accessible by the provisioning server 235. For example, if there is a new application server 215c being introduced into the composite Web application to handle increased load, then the application server 215c can query the provisioning server 230 for configuration information. In one embodiment, some configuration parameters being requested from the provisioning server depend on the relationship between the requesting component —such as application server 215c —and some or all of the other components of the composite Web application. Furthermore, some components only have access to certain configuration parameters if they have the right relationship with some or all of the other components of the composite Web application.

Figure 4:
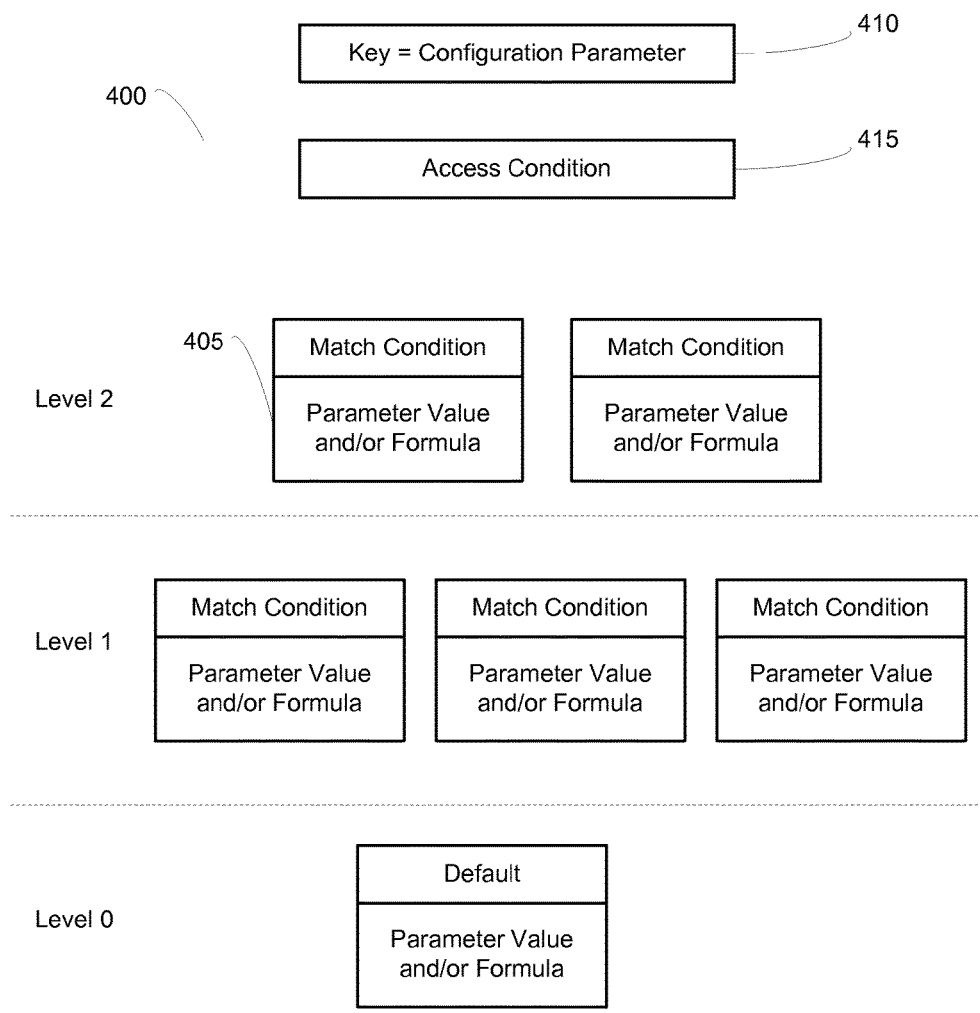
FIG. 4 is a block diagram illustrating a hierarchical data structure for storing configuration parameter values according to one embodiment of the present invention.

In one embodiment, the provisioning server manages the configuration parameter and accesses dependencies of the composite Web application using a hierarchical data structure. An example of a hierarchical data structure is provided in FIG. 4. In the embodiment shown, the hierarchical data structure 400 is logically organized in levels (L2, L1, L0). Each level has one or more elements 405. Each element includes a match condition and a parameter value, or a formula to calculate a parameter value. Each configuration parameter has an associated hierarchical data structure 400. Thus, the requested configuration parameter 410 is the key into the hierarchical data structure 400.

In one embodiment, the match condition represents the condition the requesting component should satisfy to access and be provided the parameter value in the element 405. In one embodiment, the match conditions of elements 405 of the same level of hierarchy use the same information about the requesting component. In one embodiment, the levels are checked for a match starting with the highest level and ending with the default (L0) level if no other matches are found.

In one embodiment, the hierarchical data structure 400 also has an access condition 415 that should be satisfied by the requesting component before access to the elements 405 is granted. In other embodiment, the access condition 415 can be incorporated into every match condition, including the default condition, of each element 405 of the hierarchical data structure. Various examples illustrating the hierarchical data structure are provided below with reference to FIGS. 5-8.

Figure 5:
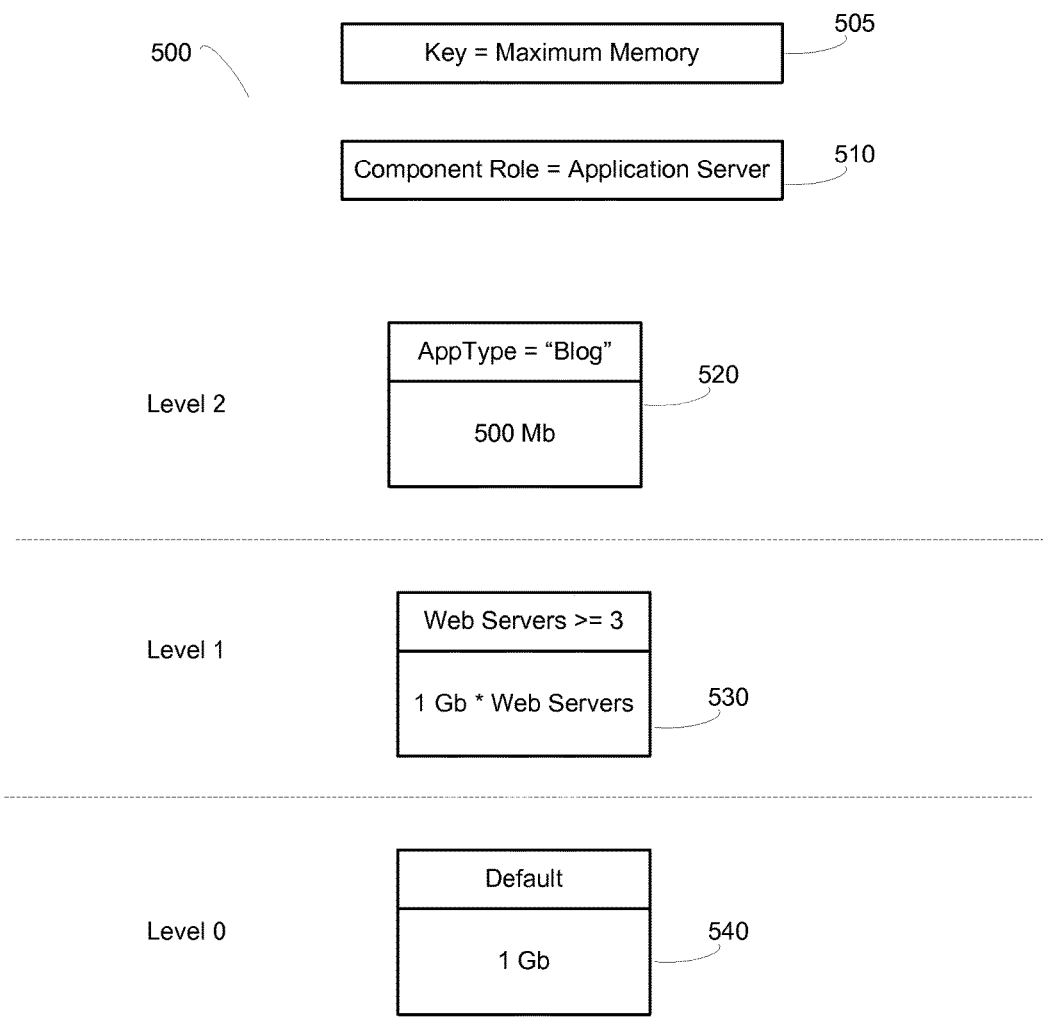
FIG. 5 is a block diagram illustrating a hierarchical data structure for storing maximum memory configuration parameter values according to one embodiment of the present invention.

FIG. 5 is a block diagram illustrating a hierarchical data structure 500 that stores configuration parameters and formulas for the configuration parameter of maximum memory. When a new server is being provisioned as a network (cloud) based virtual machine, one configuration parameter to be determined is how much physical memory the virtual machine will be allowed to access. Thus, when a new server is created to instantiate a component of the composite Web application, the new component can request the configuration parameter of maximum memory from the provisioning server.

The provisioning server can then access the configuration data store and locate the hierarchical data structure 500 using the maximum memory parameter as the key 505. In one embodiment, before matching the element of the hierarchical data structure 500 containing the appropriate configuration parameter value, the access condition 510 is evaluated to determine whether the requesting component has access to the requested value. In the example of FIG. 5, the access condition is that the role of the requesting component is an application server of the composite Web application.

Thus, if the requesting component is a Web server, in this example, then it would not be provided the requested configuration parameter. Thus, when a request is received, in one embodiment, the component identifier of the requesting component is used to look up the role of the component in the VM table or similar data structure. If the access condition requires other information about the component, then such information is retrieved from the VM table, the application table, or other similar data structures.

If the access condition is satisfied, in this example, the role of the requesting component is indeed that of application server, then the information about the component for checking the match conditions on the highest level of the hierarchical data structure 500. In the example of FIG. 5, the highest level of the hierarchical data structure 500 is level two, and there is one element 520 on level two.

The information about the component for checking the level two match conditions may be the application type.

Thus, the application type of the composite Web application that component will be part of can be looked up in the VM table or similar data structure. The match condition in element 520 is that the application type is blog. Thus, if the requesting application server—in this example—is part of a blog composite application, then the match condition of element 520 is satisfied, and the value contained in element 520 (500 Mb) is provided as the maximum memory for the component. In this manner, information about the composite application in general is used to determine a configuration parameter of a component of the composite application.

If the match condition of element 520 is not satisfied, then, since there are no other elements on level two, the next level of the hierarchical data structure is accessed. Level one also has one element 530. The information about the component needed to check the level one match conditions is the number of Web server components of the composite application. Thus, in this example, the composite Web application that component will be part of is looked up in the VM table or similar data structure, and then the number of Web servers of the application will be looked up in the application table, or similar data structure.

The match condition in element 530 may be that the composite application the requesting component is part of has three or more Web servers. Thus, if the requesting application server—in this example—has five Web servers, then the match condition of element 530 is satisfied. Instead of a simple constant value, element 530 contains a formula for calculating the value for the requested configuration parameter.

In this example, the formula in element 530 states that the value for the maximum memory is 1 Gb times the number or Web servers. Thus, in this example, five Web servers would result in a value of 5 Gb returned for the requested maximum memory configuration parameter. In this manner, information about other components of the composite application can be used to determine a configuration parameter for a requesting component of the composite application.

However, if the composite Web application has, for example, two Web servers, then the match condition of element 530 would not be satisfied. Since there are no additional elements on level one of the hierarchical data structure 500, level zero is accessed. Level zero is the default level. In one embodiment, the default level has one element 540 and no match condition. When level zero is accessed, the value on the default element—in this example 1 Gb—is returned as the requested maximum memory value.

Figure 6:
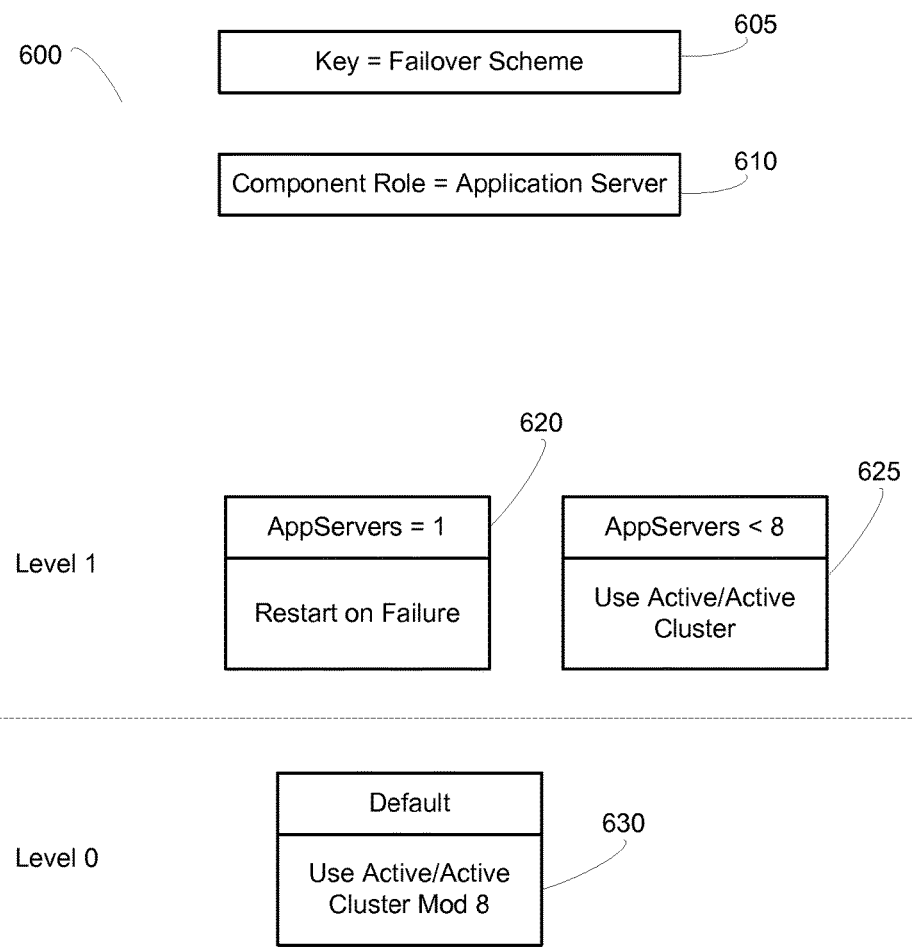
FIG. 6 is a block diagram illustrating a hierarchical data structure for storing failover scheme configuration parameter values according to one embodiment of the present invention.

FIG. 6 is another example of looking up and determining a configuration parameter being requested by a composite application in a hierarchical data structure. FIG. 6 is a block diagram illustrating a hierarchical data structure 600 that stores configuration parameters and formulas for the configuration parameter of failover scheme. As discussed above, the key 605 into the hierarchical data structure 600 is failover scheme, and the access condition 610 is once again that the requesting component be assigned the role of application server in the composite application.

Since level 1 is the highest level in this example, this level is the first to be accessed. The information about the component needed to check the level one match conditions is the number of application servers in the composite application after the inclusion of the application server being provisioned. Thus, the VM table and the application table are accessed to determine the number of application servers already operating in the composite application.

The match condition of element 620 is that the number of application servers in the composite application is one, meaning that the application server being provisioned is the first application server of the composite application. In this case, the value for the failover configuration parameter is to "restart on failure." If the composite application is found to already have three application servers, then the match condition of element 620 is not satisfied, but the match condition of element 625 of level one would be. The match condition of elements 620 and 625 both require the same information about the composite application or its components to evaluate, since they are both on level 1.

Thus, the composite application having three application servers would satisfy the match condition of element 625, which requires that the composite application have less than eight application servers. In such a situation, an active/active node configuration can be used to implement a high availability failover cluster, and the value active/active is returned as the failover scheme to use for the new application server being provisioned. (In an active/active cluster traffic intended for a failed node is passed to another node or load balanced to all or several remaining nodes.) Since the provisioning server is also aware of the other application servers, the clustering can be automatically configured in the new application server. Furthermore, in one embodiment, the configuration information of those components can be automatically updated to reflect the addition of the new application server to the active-active cluster.

If the composite application has more than eight application servers, then the default level is accessed, and the default value is applied. In this example, the default rule is that size eight active-active clusters are created. Thus, if the number of application servers modulo eight is zero, then a new failover cluster is started for the new application server. Otherwise, the new application server is added to the failover cluster than has fewer than eight members.

Figure 7:
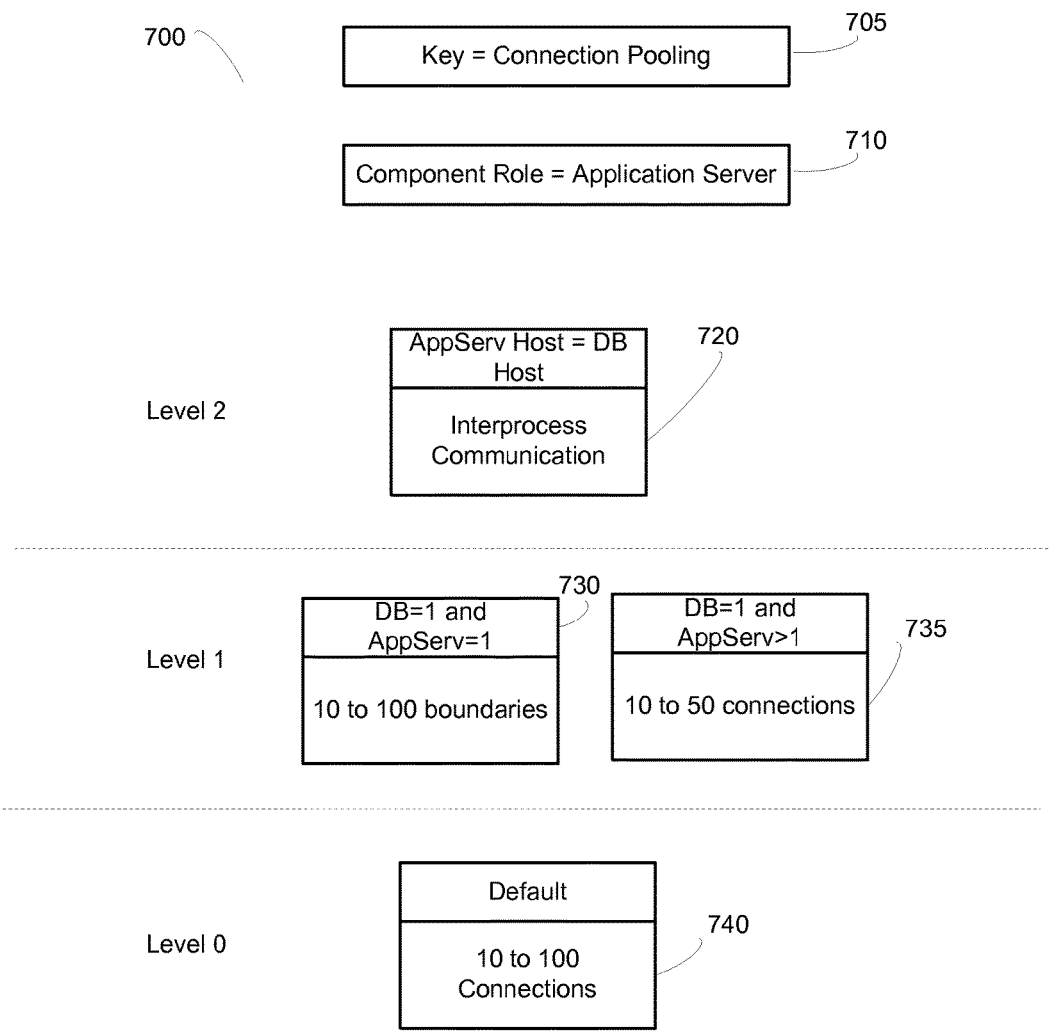
FIG. 7 is a block diagram illustrating a hierarchical data structure for storing connection pooling configuration parameter values according to one embodiment of the present invention.

FIG. 7 is another example of looking up and determining a configuration parameter being requested by a composite application in a hierarchical data structure. FIG. 7 is a block diagram illustrating a hierarchical data structure 700 that stores configuration parameters and formulas for the configuration parameter of connection pooling. Other resource pooling configuration parameters can be implemented in a substantially similar manner. The operation of, and accesses to, the hierarchical data structure 700 is similar to that described with reference to FIGS. 5 and 6, and will not be discussed in as much detail.

The hierarchical data structure 700 also illustrates that compound conditions can be used for the match conditions of elements, and also for the access rule (although that is not the case in FIG. 7). Element 720 implements the highest level rule, that if the host physical machine of the requesting application server is the same as the host physical machine of the database to be connected to the requesting application server (i.e., the two components are hosted on the same physical machine), then interprocess communication should be used for connection pooling.

At level one, element 730 has a compound match condition. In this example, the match condition is satisfied if both the number or databases and the number of application servers of the composite application are one. Thus, these two pieces of information are first retrieved, and then compared with the level one match conditions in element 730, and in element 735 if the match condition of element 730 is not satisfied. Similarly, the match condition of element 735 is satisfied if the composite application has one database, but more than one application servers. If none of the level one elements apply, then the default value of element 740 of level zero is returned as the connection pooling configuration parameter.

Figure 8:
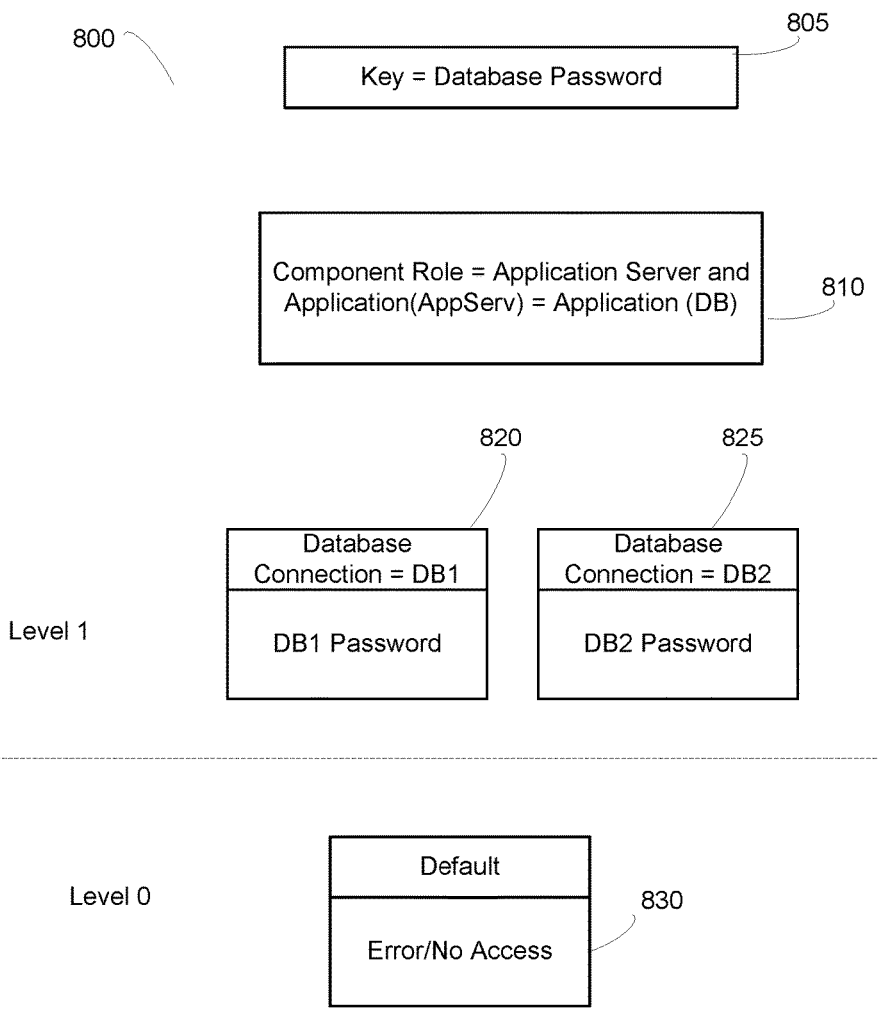
FIG. 8 is a block diagram illustrating a hierarchical data structure for storing database password configuration parameter values according to one embodiment of the present invention.

FIG. 8 is another example of looking up and determining a configuration parameter being requested by a composite application in a hierarchical data structure. FIG. 8 is a block diagram illustrating a hierarchical data structure 800 that stores configuration parameters and formulas for the configuration parameter of database password. In this example, when a new application server is added to the composite application, it needs to know the passwords of the databases to which it is connected. The operation of and accesses to the hierarchical data structure 800 is similar to that described with reference to FIGS. 5 and 6, and will not be discussed in as much detail.

The database password example illustrated, among other things, that the access condition 810 can be a compound condition as well. In this example, a component is allowed access to database passwords if its role in the composite application is that of application server, and the databases whose passwords are requested are components of the same application.

In another embodiment, this access condition can be built into the match statements of elements 820 and 825. For example, in addition to requiring that the requested database connection be DB1 (a database), the match condition can include the condition that DB1 be part of the same composite application as the requesting application server. Element 825 can include a similar compound condition for DB2 in its match condition. In this manner, access can be restricted to both an entire hierarchical data structure 800—using an access condition—and on an element-by-element basis—using compound match conditions for elements to control access in addition to matching values for configuration parameter requests.

FIGS. 4-8 only illustrate a few examples of using a hierarchical data structure to store configuration parameter values and to control access to those values. Each of the examples above assumed that an application server was being provisioned, but similar techniques can be used to provision any type of component for a composite application. As these examples demonstrate, by having an entity independent of the composite application, but aware of the components of the composite application and their roles in the composite application, store the values and rules for configuration parameters, access to such configuration parameters can be controlled based on the roles of the various components being provisioned. Furthermore, more complex, more component-aware, and more application-aware configuration parameter rules can be created when it is possible to use information about other components of a composite application during provisioning of a new or existing component of the composite application.

Figure 9:
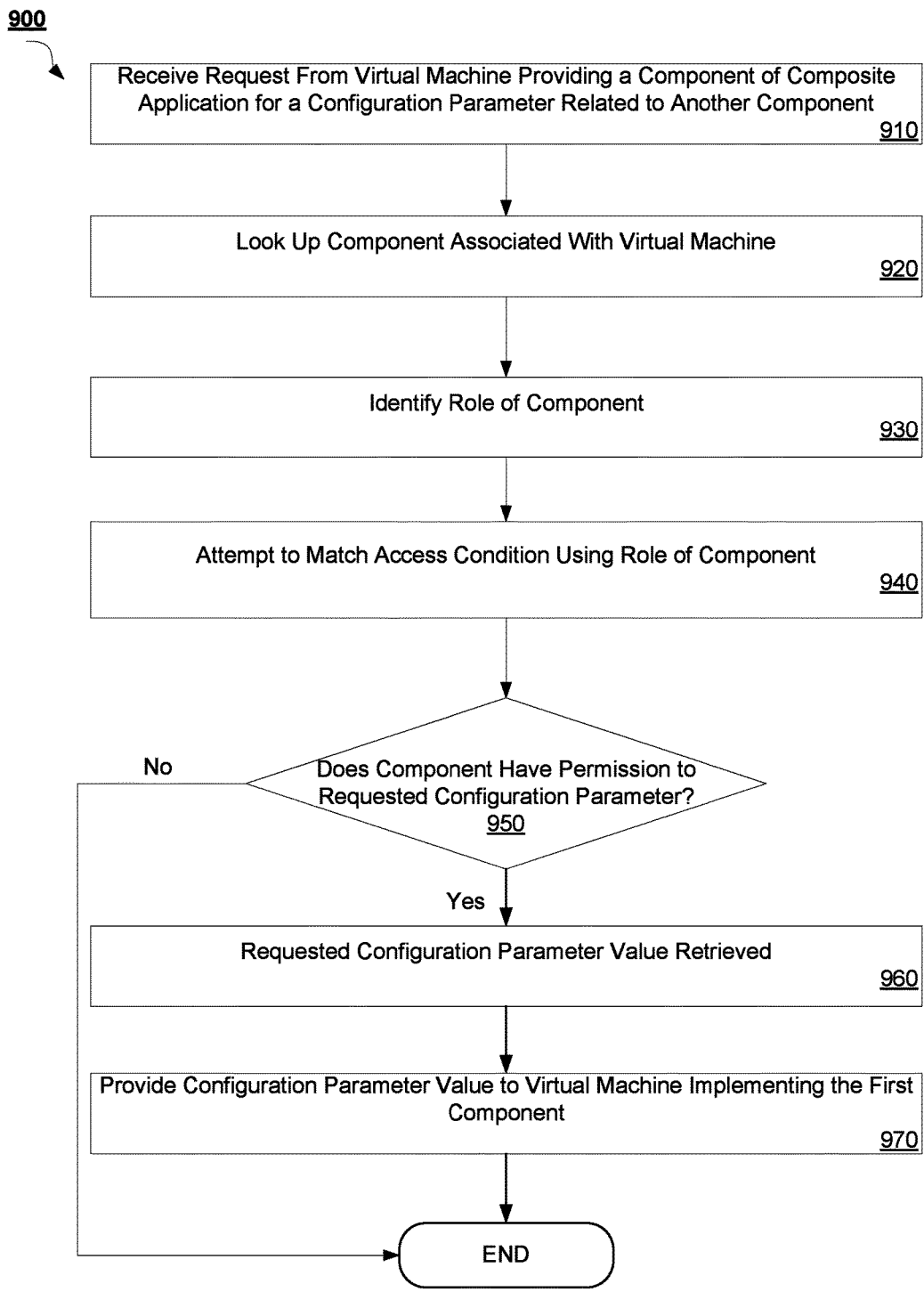
FIG. 9 is a flow diagram illustrating virtual machine provisioning according to one embodiment of the present invention.

FIG. 9 is a flow diagram illustrating a method 900 for servicing a request for a configuration parameter from a component of a composite application according to an embodiment of the invention. Method 900 may be performed by processing logic that may comprise hardware (e.g., circuitry, dedicated logic, programmable logic, microcode, etc.), software (such as instructions run on a processing device), firmware, or a combination thereof. In one embodiment, method 900 is performed by provisioning server 230 of FIG. 2.

Method 900 begins at block 910 where a request is received by an entity, such as the provisioning server, that is aware of all components of a composite application. In one embodiment, the composite application is being implemented using multiple virtual machines in a cloud-based Web application hosting environment, where the owner of the composite application can select the different components of the composite application the owner wants to implement. The request is from one such virtual machine that is being configured upon creation or as part of ongoing periodic reconfiguration.

In one embodiment, the received request is a request for, or includes a request for, a specific configuration parameter. For example, the configuration parameter can be a database password for a database management system component. The requested configuration parameter, in one embodiment, is related to another component of the composite application, as with the database password example.

At block 920, the component of the composite application implemented in the virtual machine from which the request was received is identified. This can be done, for example, by looking up an identifier of the virtual machine that sent the request for the configuration parameter in a table or database that associates composite application components with virtual machines. In one embodiment, each virtual machine implements one component of the composite application. In other words, in such an embodiment, each component is implemented using a separate virtual machine. For example, if a second Web server is desired in addition to a current Web server, a new virtual machine implementing the new Web server is created and provisioned.

At block 930 the role of the component is identified. Generally, Web applications have some established roles for servers, such as Web server, application server, database server, mobile app server, orchestration server, ad server, load balancing server, etc. However, other applications or Web applications can divide roles differently or according to a non-traditional scheme.

At block 940, an attempt is made to match an access condition that should be satisfied to access the requested configuration parameter. For example, if database servers only connect to application servers, then the access condition to a database password may be that the role of the requesting component be application server. In another embodiment, the access condition is specific not only to the role of the requesting component but to the relationship of the requesting component to the component that is related to the requested configuration parameter.

For example, in the case of a database password, the access condition can be that the requesting component have the role of application server, and that the requesting application server be connected to the database whose password is requested. One example of a hierarchical data structure to implement such an access condition is described with reference to FIG. 8 above.

At block 950, a determination is made as to whether permission to have the requested configuration parameter is granted. If permission is denied, processing terminates. In one embodiment, if the requested configuration parameter is needed to provision the requesting component, then an error message may be generated or an alternate configuration parameter may be used or attempted.

If, however, access to the requested configuration parameter is granted, then, at block 960, the value of the requested configuration parameter is retrieved. In one embodiment, this is done by locating the appropriate value by traversing levels of match conditions of a hierarchical data structure. In other embodiment, the requested value can be looked up in a table, a database, a tree structure, or some other data structure. At block 970 the value for the requested configuration parameter is provided to the virtual machine from which the request was received in block 910, and processing terminates. When a new virtual machine is being provisioned, many configuration parameters can be requested and provided simultaneously or in parallel.

Figure 10:
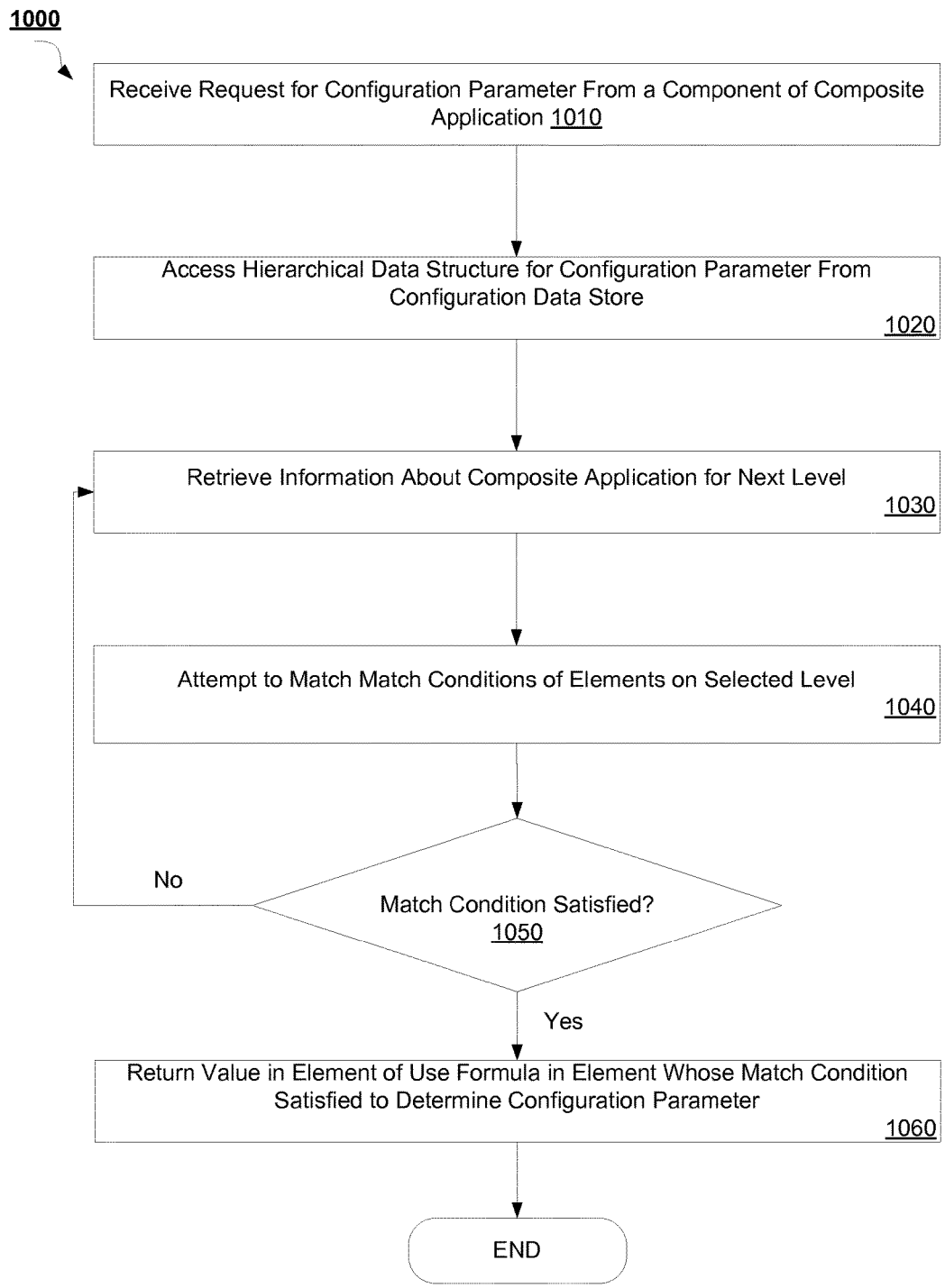
FIG. 10 is a flow diagram illustrating using a hierarchical data structure for virtual machine provisioning according to one embodiment of the present invention.

FIG. 10 is a flow diagram illustrating a method 1000 for looking up a value for a configuration parameter for a component of a composite application according to an embodiment of the invention. Method 1000 may be performed by processing logic that may comprise hardware (e.g., circuitry, dedicated logic, programmable logic, microcode, etc.), software (such as instructions run on a processing device), firmware, or a combination thereof. In one embodiment, method 1000 is performed by provisioning server 230 of FIG. 2.

Method 1000 begins at block 1010 where a request for a configuration parameter is received from a component of a composite application. At block 1020, the hierarchical data structure associated with the requested configuration parameter is accessed. In one embodiment, the requested configuration parameter is used as a key to locate the appropriate hierarchical data structure from a group of hierarchical data structures stored in a configuration data store.

At block 1030, the next appropriate level of the hierarchical data structure is selected and information about the composite application associated with the selected level is retrieved. When the hierarchical data structure is first accessed in response to the received request, the highest level is the first level accessed. The information about the composite application retrieved is the information used to check match conditions of elements of the selected level of the hierarchical data structure, such as the type of the composite application, the number of components, the number of databases, or whatever information is checked by the match conditions of the selected level.

In one embodiment, the information about the composite application relate to components other than the requesting component. In yet other embodiments, the information about the composite application also include relationships between the requesting component and one or more other components of the composite application, such as how many application severs are connected to a requesting database server.

At block 1040, attempts are made to match the match conditions of the elements of the selected level of the hierarchical data structure using the retrieved information about the composite application. At block 1050, a determination is made as to whether any of the match conditions of the elements of the selected level of the hierarchical data structure have been satisfied. If the match condition of one of the elements of the selected level of the hierarchical data structure is satisfied, then, in block 1060, the value from the element whose match condition is satisfied is returned as the requested configuration parameter value to the requesting component of the composite application.

However, if none of the match conditions of the elements of the selected level of the hierarchical data structure are satisfied, then processing continues at block 1030 with the selection of the new level of the hierarchical data structure and the retrieving of the information about the composite application needed to check the match conditions of the one or more elements of this next selected level. In one embodiment, the processing is guaranteed to terminate by the use of a default element on the lowest level of the hierarchical data structure, as explained further above.

Figure 11:
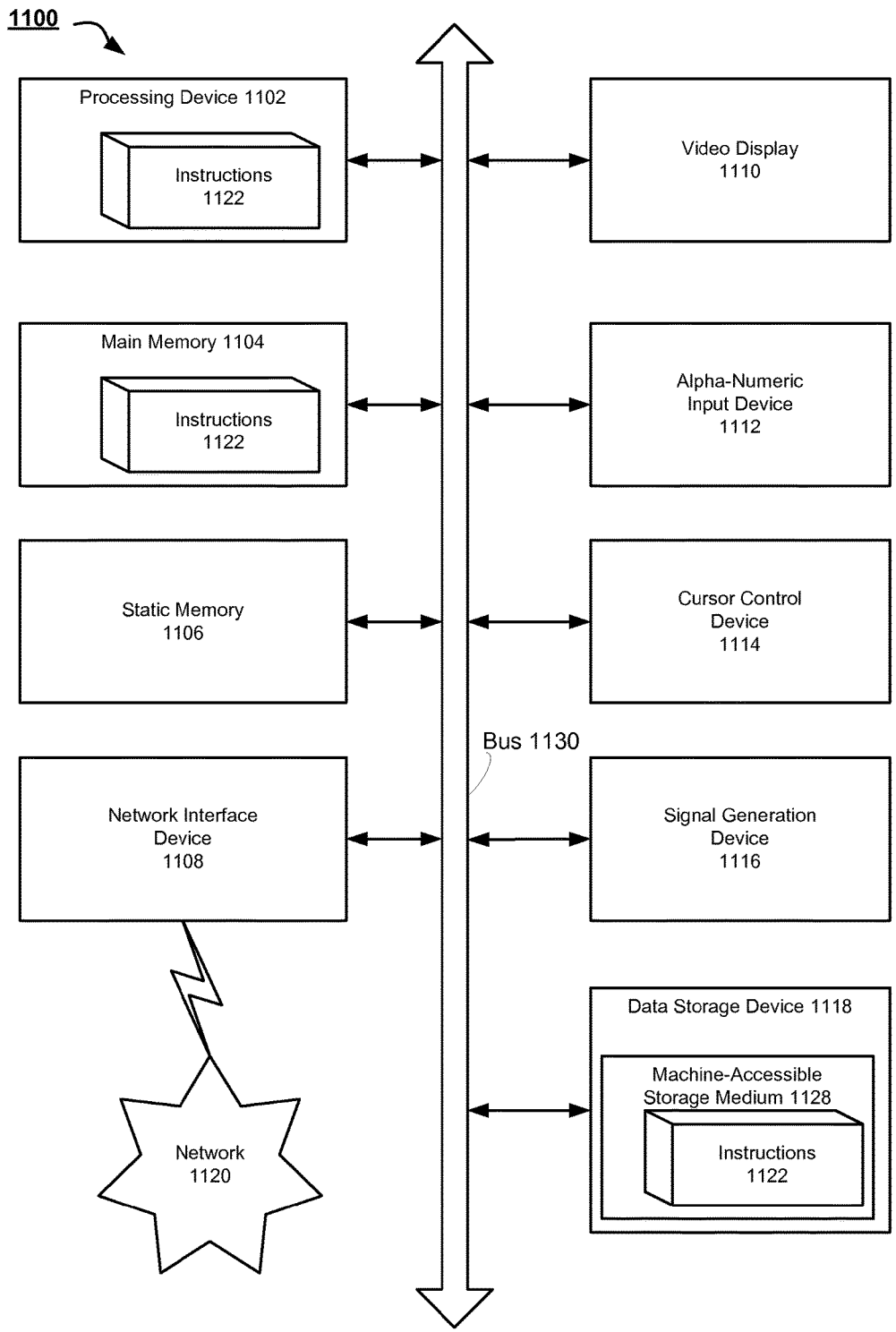
FIG. 11 illustrates a block diagram of one embodiment of a computer system.

FIG. 11 illustrates a diagrammatic representation of a machine in the exemplary form of a computer system 1100 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device 1102, a main memory 1104 (e.g., read-only memory (ROM), flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute the instructions 1122 for performing the operations and steps discussed herein.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a machine-accessible storage medium 1128 on which is stored instructions 1122 embodying any one or more of the methodologies of functions described herein. For example, instructions 1122 may be instructions to perform component provisioning described with respect to FIG. 9. The instructions 1122 may also reside, completely or at least partially, within the main memory 1104 and/or within the processing device 1102 during execution thereof by the computer system 1100; the main memory 1104 and the processing device 1102 also constituting machine-accessible storage media.

The machine-readable storage medium 1128 may also be used to store instructions to perform component provisioning described with respect to FIG. 9, and/or a software library containing methods that call the above applications. While the machine-accessible storage medium 1128 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   implementing a composite Web application, the implementing involving a first virtual machine (VM) to be hosted on a first physical machine and a second virtual machine to be hosted on a second physical machine, wherein the first physical machine and the second physical machine are located in a data center;
   provisioning the first virtual machine on the first physical machine;
   provisioning the second virtual machine on second physical machine;
   instantiating a first component of the composite Web application on the first virtual machine and a second component of the composite Web application on the second virtual machine, wherein the first component has a first role of an application server and the second component has a second role of a database management system;
   receiving, by a processing device of a provisioning server, a request for a configuration parameter from the first component of the composite Web application, the configuration parameter being a password that enables periodic reconfiguration to communication between the first component and the second component;
   identifying, by the processing device of the provisioning server, the first role of the first component of the composite Web application by looking up an identifier of the first component within a stored VM table;
   accessing, within a hierarchical data structure, an access condition that specifies a role condition or relationship condition of the requesting first component that is satisfied to access the configuration parameter and enable the communication with the second component;
   verifying that the access condition is satisfied by the first component;
   upon verification of the access condition, providing the configuration parameter to the first virtual machine associated with the first component;
   reconfiguring the first virtual machine of the first component of the application server to access the second component using the requested configuration parameter; and
   allowing the communication between the first component and the second component based on the requested configuration parameter.

2. The method of claim 1, further comprising denying the requested configuration parameter in response to a determination that the first component does not have access to the requested configuration parameter.

3. The method of claim 1, wherein the provisioning server communicates with the first VM and the second VM via a network.

4. The method of claim 1, wherein the first VM and the second VM are virtual machines of a cloud-based Web application hosting environment.

5. The method of claim 1, further comprising:
   determining whether the application server has access to the password, wherein the determining comprises identifying whether the database management system is related to the application server in the composite Web application.

6. The method of claim 1, wherein a match condition of the at least one element of the hierarchical data structure comprises at least one of an application type of the first component being a predetermined application type or the first component having a threshold number of servers.

7. The method of claim 1, further comprising identifying a second role of the second component of the composite Web application, wherein the second role indicates a second functionality provided by the second component, and wherein determining whether the first component has access to the requested configuration parameter is further in view of the second role of the second component.

8. A system comprising:
   a memory, and
   a processing device operatively coupled to the memory to:
   implement a composite Web application, the implementing involving a first virtual machine (VM) to be hosted on a first physical machine and a second virtual machine to be hosted on a second physical machine, wherein the first physical machine and the second physical machine are located in a data center;
   provision the first virtual machine on the first physical machine;
   provision the second virtual machine on second physical machine;
   instantiate a first component of the composite Web application on the first virtual machine and a second component of the composite Web application on the second virtual machine, wherein the first component has a first role of an application server and the second component has a second role of a database management system;
   receive a request for a configuration parameter from the first component of the composite Web application, the configuration parameter being a password that enables periodic reconfiguration to communication between the first component and the second component;
   identify the first role of the first component of the composite Web application by looking up an identifier of the first component within a stored VM table;
   access, within a hierarchical data structure, an access condition that specifies a role condition or relationship condition of the requesting first component that is satisfied to access the configuration parameter and enable the communication with the second component;
   verify that the access condition is satisfied by the first component;
   upon verification of the access condition, provide the configuration parameter to the first virtual machine associated with the first component;
   reconfigure the first virtual machine of the first component of the application server to access the second component using the requested configuration parameter; and allow the communication between the first component and the second component based on the requested configuration parameter.

9. The system of claim 8, wherein the processing device further denies the requested configuration parameter in view of a determination that the first component does not have access to the requested configuration parameter.

10. The system of claim 8, wherein the processing device communicates with the first VM and the second VM via a network.

11. The system of claim 8, wherein the first VM and the second VM are virtual machines of a cloud-based Web application hosting environment.

12. The system of claim 8, wherein the processing device is further to determine whether the application server has access to the password, wherein the determining comprises identifying whether the database management system is related to the application server in the composite Web application.

13. The system of claim 8, wherein a match condition of the at least one element of the hierarchical data structure comprises at least one of an application type of the first component being a predetermined application type or the first component having a threshold number of servers.

14. The system of claim 8, wherein the processing device further identifies a second role of the second component of the composite Web application, wherein the second role indicates a second functionality provided by the second component, and wherein determining whether the first component has access to the requested configuration parameter is further related to the second role of the second component.

15. A non-transitory computer-readable storage medium programmed to include instructions that, when executed by a processing device of a provisioning server, cause the processing device to:
   implement a composite Web application, the implementing involving a first virtual machine (VM) to be hosted on a first physical machine and a second virtual machine to be hosted on a second physical machine, wherein the first physical machine and the second physical machine are located in a data center;
   provision the first virtual machine on the first physical machine;
   provision the second virtual machine on second physical machine;
   instantiate a first component of the composite Web application on the first virtual machine and a second component of the composite Web application on the second virtual machine, wherein the first component has a first role of an application server and the second component has a second role of a database management system;
   receive, by the processing device, a request for a configuration parameter from the first component of the composite Web application, the configuration parameter being a password that enables periodic reconfiguration to communication between the first component and the second component;
   identify the first role of a first server of the first component of the composite Web application by looking up an identifier of the first component within a stored VM table;
   access, within a hierarchical data structure, an access condition that specifies a role condition or relationship condition of the requesting component that is satisfied to access the configuration parameter and enable the communication with the second component;
   verify that the access condition is satisfied by the first component;
   upon verification of the access condition, provide the configuration parameter to the first virtual machine associated with the first component;
   reconfigure the first virtual machine of the first component of the application server to access the second component using the requested configuration parameter; and
   allow the communication between the first component and the second component based on the requested configuration parameter.

16. The non-transitory computer-readable storage medium of claim 15, wherein the processing device is further to deny the requested configuration parameter in view of a determination that the first component does not have access to the requested configuration parameter.

17. The non-transitory computer-readable storage medium of claim 15, wherein the processing is further to determine whether the application server has access to the password, the processing device is to identify whether the database management system is related to the application server in the composite Web application.

18. The non-transitory computer-readable storage medium of claim 15, wherein the match condition of the at least one element of the hierarchical data structure comprises at least one of an application type of the first component being a predetermined application type or the first component having a threshold number of servers.

19. The non-transitory computer-readable storage medium of claim 15, wherein the processing device is further to identify a second role of the second component of the composite Web application, wherein the second role indicates a second functionality provided by the second component, and wherein to determine whether the first component has access to the requested configuration parameter is further in view of the second role of the second component.

* * * * *